(12) United States Patent
Alpua

(10) Patent No.: US 11,929,868 B2
(45) Date of Patent: Mar. 12, 2024

(54) METHOD AND APPARATUS FOR FIXED COMMUNICATION LINE MALFUNCTION DETECTION AND RECOVERY

(71) Applicant: Elisa Oyj, Helsinki (FI)

(72) Inventor: Matti Alpua, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/036,831

(22) PCT Filed: Nov. 15, 2021

(86) PCT No.: PCT/FI2021/050771
§ 371 (c)(1),
(2) Date: May 12, 2023

(87) PCT Pub. No.: WO2022/117908
PCT Pub. Date: Jun. 9, 2022

(65) Prior Publication Data
US 2023/0353448 A1    Nov. 2, 2023

(30) Foreign Application Priority Data
Dec. 3, 2020    (FI) .................................. 20206247

(51) Int. Cl.
*H04L 41/0654*    (2022.01)
*H04L 43/0823*    (2022.01)
(Continued)

(52) U.S. Cl.
CPC ...... *H04L 41/0654* (2013.01); *H04L 43/0823* (2013.01); *H04L 43/0852* (2013.01); *H04M 3/22* (2013.01)

(58) Field of Classification Search
CPC ............. H04L 41/0654; H04L 43/0823; H04L 43/0852; H04M 3/22
(Continued)

(56) References Cited

U.S. PATENT DOCUMENTS

| | | | |
|---|---|---|---|
| 5,802,146 A | * | 9/1998 | Dulman .............. H04M 3/2254 379/120 |
| 5,874,992 A | | 2/1999 | Caporizzo |

(Continued)

FOREIGN PATENT DOCUMENTS

| | | |
|---|---|---|
| CN | 109167684 A | 1/2019 |
| EP | 3570494 A2 | 11/2019 |

(Continued)

OTHER PUBLICATIONS

European Patent Office, International Search Report and Written Opinion of the International Searching Authority, Application No. PCT/FI2021/050771, daetd Feb. 2, 2022, 13 pages.

(Continued)

*Primary Examiner* — Binh Kien Tieu
(74) *Attorney, Agent, or Firm* — Ziegler IP Law Group

(57) ABSTRACT

A method, apparatus and computer program are disclosed for fixed communication line malfunction detection and recovery, including: monitoring states of a plurality of fixed communication lines; extrapolating future states of the plurality of fixed communication lines; determining a recovery group having as members any of the plurality of fixed communication lines having future states extrapolated to decline below a predetermined minimum quality threshold; and causing initiation of recovery action for each member of the recovery group before the extrapolated decline below the predetermined minimum quality threshold.

14 Claims, 3 Drawing Sheets

(51) Int. Cl.
 *H04L 43/0852* (2022.01)
 *H04M 3/22* (2006.01)
(58) Field of Classification Search
 USPC ..................................................... 379/22.03
 See application file for complete search history.

(56) References Cited

U.S. PATENT DOCUMENTS

| | | | | |
|---|---|---|---|---|
| 5,937,042 | A * | 8/1999 | Sofman | H04Q 3/0083 379/112.01 |
| 6,480,748 | B1 * | 11/2002 | Gerszberg | H04L 12/2856 379/247 |
| 11,252,084 | B1 * | 2/2022 | Cai | H04L 45/306 |
| 2006/0146986 | A1 * | 7/2006 | Bentley | H04L 27/2601 379/9.06 |
| 2006/0153174 | A1 * | 7/2006 | Towns-von Stauber | H04L 1/20 370/356 |
| 2009/0181665 | A1 * | 7/2009 | Sater | H04L 41/5064 455/424 |
| 2011/0096673 | A1 * | 4/2011 | Stevenson | H04M 7/0024 370/252 |
| 2014/0023189 | A1 * | 1/2014 | Lins de Medeiros | H04L 5/0046 379/406.01 |

FOREIGN PATENT DOCUMENTS

| | | |
|---|---|---|
| FI | 20206247 B | 5/2022 |
| WO | 2005053303 A2 | 6/2005 |
| WO | 2011162885 A1 | 12/2011 |

OTHER PUBLICATIONS

Finnish Patent and Registration Office, Communication of Acceptance, Application No. 20206247, dated Dec. 13, 2021, 4 pages.
Finnish Patent and Registration Office, Office Action, Application No. 20206247, dated Jun. 24, 2021, 5 pages.

* cited by examiner

Fig. 3

| |
|---|
| 300. monitoring states of plurality of fixed communication lines |
| 305. extrapolating future states of plurality of fixed communication lines |
| 310. determining a recovery group comprising as members any of plurality of fixed communication lines having future states extrapolated to decline below predetermined minimum quality threshold |
| 315. causing initiation of recovery action for each member of recovery group before extrapolated decline below predetermined minimum quality threshold |
| 320. performing monitoring based on power of signals transferred over fixed communication lines |
| 325. receiving power measurements from terminal devices in monitoring |
| 330. performing monitoring based on symbol error rate |
| 335. performing monitoring based on bit error rate |
| 340. performing monitoring based on latency of terminal devices |
| 345. in monitoring, testing latency by determining round trip times with terminals |
| 350. performing monitoring based on variation of fixed communication line state measurements |
| 355. performing method by automated control agent |
| 360. timing initial recovery action to occur during low use time |
| 365. computing current periodical trends of states of fixed communication lines in extrapolating |
| 370. reporting changes in members of recovery group |
| 375. verifying whether caused initiation of recovery action succeeded to cause recovery of corresponding fixed communication lines |

METHOD AND APPARATUS FOR FIXED COMMUNICATION LINE MALFUNCTION DETECTION AND RECOVERY

TECHNICAL FIELD

The present disclosure generally relates to a method and apparatus for fixed communication line malfunction detection and recovery.

BACKGROUND

This section illustrates useful background information without admission of any technique described herein representative of the state of the art.

Rapid advances of wireless communications have in part facilitated a disruptive change of the whole world to an interconnected system wherein people and devices may communicate almost everywhere and anytime. However, fixed communication lines are still required for transferring traffic both in core networks and last miles, i.e., as subscriber lines. Fixed communication lines are more expensive to install and more prone to damage by elements and man, e.g., construction worker hitting an underground cable by an excavator. Otherwise, fixed communication lines tend to outperform wireless connections in terms of stableness of throughput and uptime or percentage of time the connection is functionable.

Fixed communication lines may fail abruptly, but sometimes also by gradual degradation. The latter may occur not only because of the actual electrically or optically conducting line deteriorating, but because of terminal equipment malfunctioning one way or another. One common source of gradual degradation is a software failure causing some corruption of required tables or filling of registers.

Gradual degradation of a fixed communication line may go unnoticed, because users become accustomed to the prevailing condition. Some fixed malfunction conditions may be automatically monitored to identify failure state. However, at this point, communications may already be prevented or hampered. On the other hand, if the threshold for identifying malfunction is lowered, false positive determinations will be made with adverse consequences. For example, if an automated reboot is commanded on identifying a failure state, excessive reboots and connectivity interruptions may result. Even brief interruptions may be harmful especially if sessions expire for timeout or change of dynamically assigned IP address.

SUMMARY

The appended claims define the scope of protection. Any examples and technical descriptions of apparatuses, products and/or methods in the description and/or drawings not covered by the claims are presented not as embodiments of the disclosed embodiments but as background art or examples useful for understanding the disclosed embodiments.

According to a first example aspect of the present disclosure there is provided a method for fixed communication line malfunction detection and recovery, comprising:
monitoring states of a plurality of fixed communication lines;
extrapolating future states of the plurality of fixed communication lines;
determining a recovery group comprising as members any of the plurality of fixed communication lines having future states extrapolated to decline below a predetermined minimum quality threshold; and
causing initiation of recovery action for each member of the recovery group before the extrapolated decline below the predetermined minimum quality threshold, wherein the initial recovery action comprises any one or more of: forced renewal of internet address; terminal rebooting; terminal patching.

The monitoring may be based on power of signals transferred over the fixed communication lines. The monitoring may comprise receiving power measurements from terminal devices.

The monitoring may be based on symbol error rate. The monitoring may be based on bit error rate.

The monitoring may be based on latency of the terminal devices. The monitoring may comprise testing the latency by determining round trip times with the terminals. The round trip times may be measured using echo message requests and corresponding responses. The round trip times may be measured using acknowledgement messages sent by the terminals.

The monitoring may be based on data rate of the terminal devices. The monitoring may comprise testing the data rate with the terminals.

The monitoring may be based on variation of fixed communication line state measurements. The variation may be defined as a variance or a derivative thereof computed from the fixed communication line state measurements. The minimum quality threshold may require a given maximum variance. Additionally, or alternatively, the minimum quality threshold may require a given minimum variance.

The method may be performed by an automated control agent. The automated control agent may be configured to control one or more local or regional network controllers.

The initial recovery action may comprise forced renewal of internet address. The initial recovery action may comprise terminal rebooting. The initial recovery action may comprise terminal patching. The patching may comprise updating or upgrading firmware. The initial recovery action may comprise terminal provisioning. The provisioning may override local communication protocol setting changes.

The initial recovery action may be timed to occur during low use time. The low use time may be determined for each terminal during the monitoring. The initial recovery action may be timed to occur during low use time provided that the extrapolation indicates that the fixed communication line remains operable until the low use time. The fixed communication line may be considered operable when the future state is extrapolated to remain above a predetermined operability threshold. The operability threshold may be lower than the minimum quality threshold. The operability threshold may be at most 1%; 2%; 5%; 10% or 20% lower than the minimum quality threshold. The operability threshold may be at least 0.1%; 1%; 2%; 5%; 10% or 15% lower than the minimum quality threshold.

The minimum quality threshold may be at defined so that at the minimum quality threshold, the fixed communication line is capable of average communication rate with at least 50%; 60%; 70%; 80%; 90%; or 95% of nominal communication rate defined for the fixed communication line. The nominal communication rate defined for the fixed communication line may be lower than technical maximum.

The extrapolating may comprise computing current periodical trends of the states of the fixed communication lines. The current periodical trends may be computed using a linear regression model. The current periodical trends may be computed using a first averaged state computed from temporal states at a first period of time and using a second averaged state computed from temporal states at a second period of time after the first period of time.

The future states may be extrapolated for a given period. The given period may be at least 1 min; 5 min; 10 min; 1 h; 2 h; 10 h; 1 d; 7 d; or 21 d. The given period of time may be at most 5 min; 10 min; 1 h; 2 h; 10 h; 1 d; 7 d; 21; or 30 d.

The method may further comprise reporting changes in the members of the recovery group.

The method may further comprise verifying whether the caused initiation of recovery action has succeeded to cause recovery of corresponding fixed communication lines. The method may further comprise reporting results of the verifying.

According to a second example aspect there is provided an apparatus for fixed communication line malfunction detection and recovery, comprising at least one memory and processor jointly configured to cause at least:
monitoring states of a plurality of fixed communication lines;
extrapolating future states of the plurality of fixed communication lines;
determining a recovery group comprising as members any of the plurality of fixed communication lines having future states extrapolated to decline below a predetermined minimum quality threshold; and
causing initiation of recovery action for each member of the recovery group before the extrapolated decline below the predetermined minimum quality threshold, wherein the initial recovery action comprises any one or more of: forced renewal of internet address; terminal rebooting; terminal patching.

According to a third example aspect there is provided a computer program comprising computer executable program code which when executed by at least one processor causes an apparatus at least to perform the method of the first example aspect.

According to a fourth example aspect there is provided a computer program product comprising a non-transitory computer readable medium having the computer program of the third example aspect stored thereon.

According to a fifth example aspect there is provided an apparatus comprising means for performing the method of the first example aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 3 shows a flow chart of a method for fixed communication line malfunction detection and recovery, according to an example embodiment.

DETAILED DESCRIPTION

In the following description, like reference signs denote like elements or steps.

Figure 1:
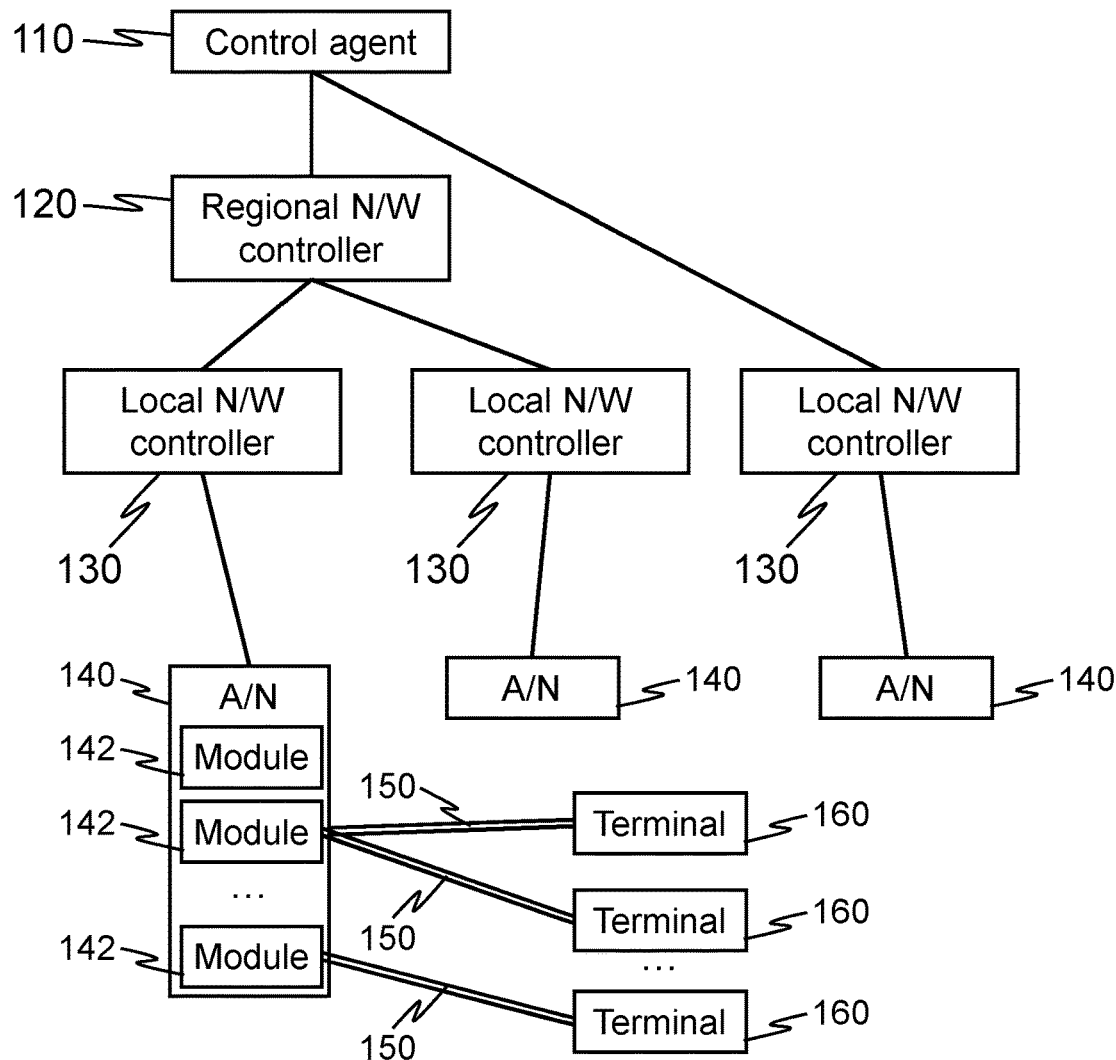
FIG. 1 schematically shows a system according to an example embodiment.

FIG. 1 schematically shows a system 100 according to an example embodiment. FIG. 1 shows a control agent 110 formed as a separate entity, a regional network controller 120 and a plurality of local network controllers 130. The local network controllers are drawn to be each either directly controlled by the control agent 110 or via the regional network controller 120. It should be appreciated that FIG. 1 is schematical presentation and some of the functionalities drawn in separate boxes may be fused or distributed into further separate functionalities and there may be also further functionalities not drawn and described as not having particular relevance for understanding embodiments described in the following.

The local network controllers 130 control access nodes 140, which may have modular implementation in which there are separate modules 142 each for one or more terminals 160. The modules 142 may be hot swappable for simple maintenance without need to interrupt operation of other modules 142. Alternatively, or additionally, the access nodes may comprise integrated connection circuitries with suitable communication interfaces such as ports for coupling with fixed subscriber lines 150. The terminals 160 communicate over the fixed subscriber lines 150. The terminals 160 act as terminals in view of the fixed subscriber line but may still relay or forward traffic over other communication channels. The terminals 160 may be operate using a technology selected from a group consisting of: digital subscriber line (DSL); asynchronous digital subscriber line (ADSL); very high-speed digital subscriber line (VDSL); single carrier (SC) fibre optical line; multi carrier (MC) fibre optical line; or any combination thereof. One example terminal 160 is a VDSL modem with a built-in router, firewall and switch. Another example terminal 160 is a router having DSL and ethernet ports as well as one or more small form-factor pluggable (SFP) fibre module slots. Such a terminal may operate as a gateway of a home or organization for internet devices (not drawn) communicating in one or more subnets. It is also possible that one terminal 160 has connectivity over two or more subscriber lines 150 for improved data rate and/or failure resilience.

It shall be understood that same access node 140 may support a plurality of different fixed line communication technologies (and also wireless ones), particularly but not exclusively in case of using the modules 142.

In an example embodiment, the access node 140 comprises an FTTH device, such as Huawei S5300-28X-LI-24S-AC. In another example embodiment, the access node 140 comprises an xDSL device, such as Huawei SmartAX MA5616.

Figure 2:
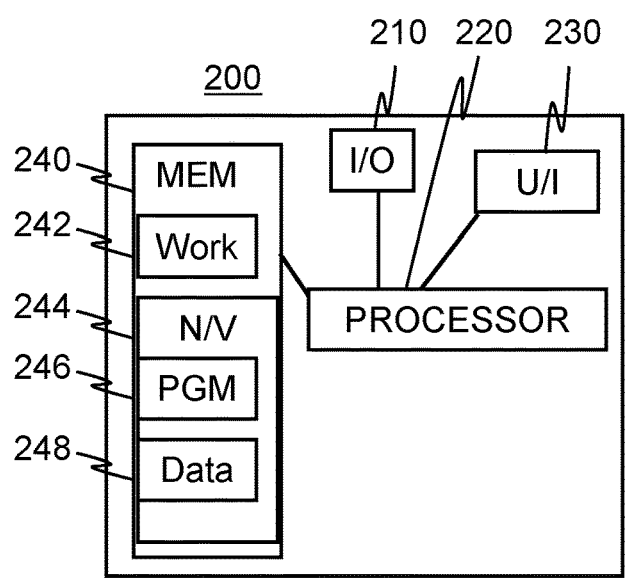
FIG. 2 shows a block diagram of an apparatus according to an example embodiment.

FIG. 2 shows a block diagram of an apparatus 200 according to an example embodiment. The apparatus 200 may be usable as the control agent 110, regional network controller, and/or local network controller 130. The apparatus 200 comprises a communication interface 210; a processor 220; a user interface 230; and a memory 240.

The communication interface 210 comprises in an embodiment a wired and/or wireless communication circuitry, such as Ethernet; Wireless LAN; Bluetooth; GSM; CDMA; WCDMA; LTE; and/or 5G circuitry. The communication interface can be integrated in the apparatus 200 or provided as a part of an adapter, card or the like, that is attachable to the apparatus 200. The communication interface 210 may support one or more different communication technologies. The apparatus 200 may also or alternatively comprise more than one of the communication interfaces 210.

In this document, a processor may refer to a central processing unit (CPU); a microprocessor; a digital signal processor (DSP); a graphics processing unit; an application specific integrated circuit (ASIC); a field programmable gate array; a microcontroller; or a combination of such elements.

The user interface may comprise a circuitry for receiving input from a user of the apparatus 200, e.g., via a keyboard; graphical user interface shown on the display of the apparatus 200; speech recognition circuitry; or an accessory device; such as a headset; and for providing output to the user via, e.g., a graphical user interface or a loudspeaker.

The memory 240 comprises a work memory 242 and a persistent memory 244 configured to store computer program code 246 and data 248. The memory 240 may comprise any one or more of: a read-only memory (ROM); a programmable read-only memory (PROM); an erasable programmable read-only memory (EPROM); a random-access memory (RAM); a flash memory; a data disk; an optical storage; a magnetic storage; a smart card; a solid-state drive (SSD); or the like. The apparatus 200 may comprise a plurality of the memories 240. The memory 240 may be constructed as a part of the apparatus 200 or as an attachment to be inserted into a slot; port; or the like of the apparatus 200 by a user or by another person or by a robot. The memory 240 may serve the sole purpose of storing data or be constructed as a part of an apparatus 200 serving other purposes, such as processing data.

A skilled person appreciates that in addition to the elements shown in FIG. 2, the apparatus 200 may comprise other elements, such as microphones; displays; as well as additional circuitry such as input/output (I/O) circuitry; memory chips; application-specific integrated circuits (ASIC); processing circuitry for specific purposes such as source coding/decoding circuitry; channel coding/decoding circuitry; ciphering/deciphering circuitry; and the like. Additionally, the apparatus 200 may comprise a disposable or rechargeable battery (not shown) for powering the apparatus 200 when external power if external power supply is not available.

FIG. 3 shows a flow chart of a method for fixed communication line malfunction detection and recovery, according to an example embodiment. FIG. 3 illustrates a process comprising various possible steps including some optional steps while also further steps can be included and/or some of the steps can be performed more than once:

- 300. monitoring states of a plurality of fixed communication lines;
- 305. extrapolating future states of the plurality of fixed communication lines;
- 310. determining a recovery group comprising as members any of the plurality of fixed communication lines having future states extrapolated to decline below a predetermined minimum quality threshold; and
- 315. causing initiation of recovery action for each member of the recovery group before the extrapolated decline below the predetermined minimum quality threshold.

The method may comprise, for example, any one or more of:

- 320. performing the monitoring based on power of signals transferred over the fixed communication lines;
- 325. receiving power measurements from terminal devices in the monitoring;
- 330. performing the monitoring based on symbol error rate;
- 335. performing the monitoring based on bit error rate;
- 340. performing the monitoring based on latency of the terminal devices;
- 345. in the monitoring, testing the latency by determining round trip times with the terminals. The round trip times may be measured using echo message requests and corresponding responses. The round trip times may be measured using acknowledgement messages sent by the terminals.

The method may comprise 350. performing the monitoring based on variation of fixed communication line state measurements. The variation is defined, for example, as a variance or a derivative thereof (such as standard deviation) computed from the fixed communication line state measurements. As an example, the minimum quality threshold may require a given maximum variance and/or a given minimum variance.

The method may comprise 355. performing the method by an automated control agent. The automated control agent may be configured to control one or more local or regional network controllers.

In an example embodiment, the initial recovery action comprises or is forced renewal of internet address. In an example embodiment, the initial recovery action comprises or is terminal rebooting. In an example embodiment, the initial recovery action comprises or is terminal patching. The patching comprises, for example, updating or upgrading firmware. In an example embodiment, the initial recovery action comprises terminal provisioning. The provisioning can be used, for example, to override local communication protocol setting changes such as setting of domain name servers, gateways, IP address acquisition settings, or credentials for gaining IP connectivity.

The method may comprise 360. timing the initial recovery action to occur during low use time. It is typically beneficial to temporally align any disruptive recovery operation to low use time so as to reduce disruption of communication services. In an example embodiment, the low use time is determined for each terminal during the monitoring. In an example embodiment, the initial recovery action is timed to occur during low use time provided that the extrapolation indicates that the fixed communication line remains operable until the low use time. The fixed communication line can be defined or considered as operable in various ways, for example, when the future state is extrapolated to remain above a predetermined operability threshold. The operability threshold can be lower than the minimum quality threshold, such as at most 1%; 2%; 5%; 10% or 20% lower than the minimum quality threshold. On the other hand, the operability threshold can be at least 0.1%; 1%; 2%; 5%; 10% or 15% lower than the minimum quality threshold.

In an example embodiment, the minimum quality threshold is defined so that at the minimum quality threshold, the fixed communication line is capable of average communication rate with at least 50%; 60%; 70%; 80%; 90%; or 95% of nominal communication rate defined for the fixed communication line. The nominal communication rate defined for the fixed communication line may be lower than technical maximum. For example, an internet service provider may have undertaken to provide 100/100 Mbps Internet connectivity with a lowest 10-minute averages at 90/90 Mbps using a 1 Gbps physical fixed communication line.

The method may comprise 365. computing current periodical trends of the states of the fixed communication lines in the extrapolating. The current periodical trends may be computed using a linear regression model. The current periodical trends may be computed using a first averaged state computed from temporal states at a first period of time and using a second averaged state computed from temporal states at a second period of time after the first period of time.

The method may further comprise any one or more of:
  370. reporting changes in the members of the recovery group;
  375. verifying whether the caused initiation of recovery action has succeeded to cause recovery of corresponding fixed communication lines. The method may further comprise reporting results of the verifying.

Figure 4:
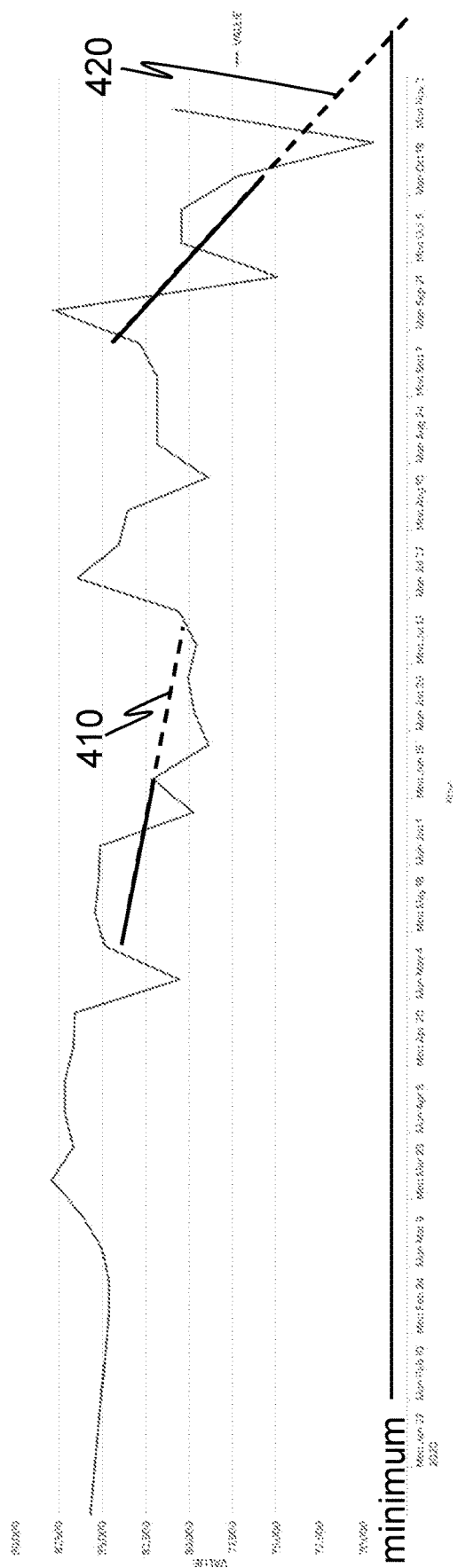
FIG. 4 shows a diagram indicating a state of fixed communication line and extrapolations formed at two different points of time.

FIG. 4 shows a diagram indicating a state of fixed communication line and extrapolations formed at two different points of time. A first extrapolation 410 presents a declining trend, but one that does not reach a given minimum threshold within a period for which the extrapolation is made. A second extrapolation 420 presents a more steeply declining trend that does decline below the predetermined minimum quality threshold. In this case, corrective action is scheduled and taken at the global minimum of FIG. 4 chart.

It is a technical advantage of at least one embodiment that plurality of fixed communication lines can be monitored, and error recovery be initiated already before excessive deterioration of the fixed communication lines. In particular, by extrapolating future states of the fixed communication lines, recovery action can be initiated in advance such that connectivity still suffices for remotely provisioning or upgrading settings or firmware of subscriber terminals where required. Moreover, by extrapolating the states, recovery action can be timed to low use period before actual deterioration occurs below acceptable level. In result, technical capability can be enhanced.

Any of the afore described methods, method steps, or combinations thereof, may be controlled or performed using hardware; software; firmware; or any combination thereof. The software and/or hardware may be local; distributed; centralised; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the present disclosure. It is however clear to a person skilled in the art that the invention is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the disclosed embodiments is only restricted by the appended patent claims.

The invention claimed is:

1. A method for fixed communication line malfunction detection and recovery, comprising:
  monitoring states of a plurality of fixed communication lines;
  extrapolating future states of the plurality of fixed communication lines;
  determining a recovery group comprising as members any of the plurality of fixed communication lines having future states extrapolated to decline below a predetermined minimum quality threshold; and
  causing initiation of recovery action for each member of the recovery group before the extrapolated decline below the predetermined minimum quality threshold, wherein the initial recovery action comprises any one or more of: forced renewal of internet address; terminal rebooting; terminal patching.

2. The method of claim 1, wherein the monitoring is based on power of signals transferred over the fixed communication lines.

3. The method of claim 1, wherein the monitoring is based on symbol error rate or bit error rate.

4. The method of claim 1, wherein the monitoring is based on latency of the terminal devices.

5. The method of claim 1, wherein the monitoring is based on variation of fixed communication line state measurements.

6. The method of claim 1, wherein the initial recovery action is timed to occur during low use time.

7. The method of claim 6, further comprising determining the low use time for each terminal during the monitoring.

8. The method of claim 6, wherein the monitoring is timed to occur during low use time provided that the extrapolation indicates that the fixed communication line remains operable until the low use time.

9. The method of claim 1, wherein the extrapolating comprises computing current periodical trends of the states of the fixed communication lines.

10. The method of claim 6, further comprising computing the current periodical trends using a linear regression model.

11. The method of claim 1, wherein further comprising reporting changes in the members of the recovery group.

12. The method of claim 1, further comprising:
  verifying whether the caused initiation of recovery action has succeeded to cause recovery of corresponding fixed communication lines; and
  reporting results of the verifying.

13. A non-transitory computer readable medium having stored thereon a set of computer readable instructions that when executed by at least one processor causes an apparatus at least to perform the method of claim 1.

14. An apparatus for fixed communication line malfunction detection and recovery, comprising at least one memory and processor jointly configured to cause at least:
  monitoring states of a plurality of fixed communication lines;
  extrapolating future states of the plurality of fixed communication lines;

determining a recovery group comprising as members any of the plurality of fixed communication lines having future states extrapolated to decline below a predetermined minimum quality threshold; and causing initiation of recovery action for each member of the recovery group before the extrapolated decline below the predetermined minimum quality threshold, wherein the initial recovery action comprises any one or more of: forced renewal of internet address; terminal rebooting; terminal patching.

\* \* \* \* \*